(12) United States Patent
Osterman et al.

(10) Patent No.: US 6,295,775 B2
(45) Date of Patent: *Oct. 2, 2001

(54) RACEWAY CONSTRUCTION FOR PANEL

(75) Inventors: Thomas J. Osterman, Grand Haven; Richard D. Elushik, Holland, both of MI (US)

(73) Assignee: Haworth, Inc., Holland, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/325,523

(22) Filed: Jun. 3, 1999

(51) Int. Cl.[7] .................................................. E04C 2/52
(52) U.S. Cl. ........................ 52/220.7; 52/239; 52/242
(58) Field of Search .................................. 52/220.7, 239, 52/242

(56) References Cited

U.S. PATENT DOCUMENTS

| | | |
|---|---|---|
| 4,060,294 | 11/1977 | Haworth et al. . |
| 4,133,153 * | 1/1979 | Hage ....................................... 52/220.7 |
| 4,199,206 | 4/1980 | Haworth et al. . |
| 4,277,123 | 7/1981 | Haworth et al. . |
| 4,278,834 | 7/1981 | Boundy . |
| 4,377,724 | 3/1983 | Wilson . |
| 4,391,073 * | 7/1983 | Mollenkopf et al. ............ 52/220.7 X |
| 4,497,356 | 2/1985 | Luck et al. . |
| 4,596,098 | 6/1986 | Finkbeiner et al. . |
| 4,683,695 * | 8/1987 | Galli ....................................... 52/242 |
| 4,713,918 | 12/1987 | Cioffi . |
| 5,065,556 * | 11/1991 | DeLong et al. ....................... 52/220.7 |
| 5,207,037 * | 5/1993 | Giles et al. ...................... 52/220.7 X |
| 5,274,970 | 1/1994 | Roberts . |
| 5,479,747 * | 1/1996 | Wu ....................................... 52/220.7 |
| 5,606,836 | 3/1997 | Insalaco et al. . |
| 5,806,258 * | 9/1998 | Miedema et al. ..................... 52/220.7 |
| 5,901,512 * | 5/1999 | Bullwinkle ........................... 52/220.7 |
| 5,974,742 * | 11/1999 | Schreiner et al. ................ 52/239 X |

FOREIGN PATENT DOCUMENTS 0 790 362    8/1997  (EP) .

* cited by examiner

Primary Examiner—Beth A. Stephan
Assistant Examiner—Brian E. Glessner
(74) Attorney, Agent, or Firm—Flynn, Thiel, Boutell & Tanis, P.C.

(57) ABSTRACT

A raceway structure which is fixedly attached to and extends longitudinally along one horizontally extending edge of a panel assembly. The raceway structure includes a U-shaped channel member which resiliently but releasably snaps into engagement with longitudinally spaced supports which are fixed to and project downwardly from the bottom frame rail of the panel. The supports occupy only minimal space within the channel member. The raceway channel member is provided with increased height relative to its width to provide upper and lower interior channel regions which accommodate power and telecommunication cabling systems. The supports are releasably engaged with upper edges of the channel member and provide the primary support for securing the channel member to the panel. The supports also provide a support or backing for the side covers of the channel member at a location disposed vertically intermediate upper and lower edges thereof so that the side covers, even with their increased vertical extent, retain their desired flat vertical configuration and can withstand side impacts which are typically imposed thereon.

21 Claims, 6 Drawing Sheets

RACEWAY CONSTRUCTION FOR PANEL

FIELD OF THE INVENTION

This invention relates to an improved raceway structure for association with an interior space-dividing upright wall panel for accommodating power and telecommunication systems therein.

BACKGROUND OF THE INVENTION

Portable wall panels interconnected to define wall systems are conventionally and extensively utilized to divide large open areas in offices and the like into smaller work areas or workstations. Such wall panels are frequently provided with a removable or openable raceway structure extending along a lower edge thereof and disposed directly above the floor for accommodating electrical and/or telecommunication cabling. In fact, specialized cabling systems and particularly electrical power systems have been developed for use in and extension along the raceway structures associated with such panel systems. Examples of such panel systems and of the raceway structures associated therewith are illustrated by U.S. Pat. Nos. 4,060,294, 4,199,206, 4,277,123, 4,377,724, 4,596,098, and 5,606,386, all owned by the assignee hereof.

With many of the known panel constructions and specifically the raceway structures associated therewith, such raceway structures have often been restrictive with respect to the space provided therein and with respect to accessibility thereof, particularly as the needs for increased capacity for accommodating electrical and telecommunication capabilities increase. While most of the current raceway constructions adequately accommodate existing electrical systems, nevertheless such raceways generally provide inadequate space for telecommunication cabling or systems. Further, the ever increasing need for increased telecommunication capability throughout the office environment continues to increase the demand for increased cabling capabilities, and many of the existing wall panels have necessarily reverted to an additional cabling channel, such as provided along the upper edge of the panel, so as accommodate the needs of the telecommunication cabling and the increasing space requirements thereof.

The present invention relates to an improved raceway structure which is fixedly attached to and extends longitudinally along one horizontally extending edge of the panel assembly, preferably along the lower edge of the panel assembly, and which provides significantly improved storage space for both power and telecommunication cabling systems while providing significant and unobstructed accessibility thereto, and thereby overcoming limitations and disadvantages associated with many of the conventional raceway structures currently in use.

More specifically, the raceway structure includes a generally U-shaped raceway channel member which resiliently but releasably snaps into engagement with longitudinally spaced supports which are fixed to and project downwardly from the bottom frame rail of the panel. The supports occupy only minimal space within the raceway channel member so as to provide significant unobstructed interior space for accommodating power and telecommunication cabling systems therein. The raceway channel member is provided with significantly increased height relative to its width so as to provide interior channel regions which extend longitudinally of the raceway and effectively define upper and lower channel regions which can individually accommodate the power and telecommunication systems.

In the improved raceway structure, as aforesaid, the supports cooperative with the raceway and are releasably engaged by upper edges of the channel member and provide the primary support for securing the channel member to the panel. The supports in addition provide a support or backing of the side covers of the channel member at a location disposed vertically intermediately upper and lower edges thereof so that the side covers, even with their increased vertical extent, retain their desired flat vertical configuration and can withstand the side impacts which are typically imposed thereon either by kicking or by floor cleaning equipment.

The improved raceway structure of the present invention, as aforesaid, also provides a construction which is economical to manufacture, is easy to install, provides significantly increased space for cabling interiorly of and longitudinally along the raceway, readily accommodates both power and telecommunication cabling systems therein, provides easy and convenient access to the interior of the raceway channel member for installing or accessing the cabling systems therein from either or both sides of the panel assembly, and provides an impact resistant structure for withstanding typical side impacts which are imposed on the side covers of the raceway while retaining the flat and planar configuration of the closed side covers of the raceway and preventing their deformation or release when subjected to accidental impacts.

Other objects and purposes of the invention will be apparent to persons familiar with constructions of this general type upon reading the following specification and inspecting the accompanying drawings.

Figure 1:
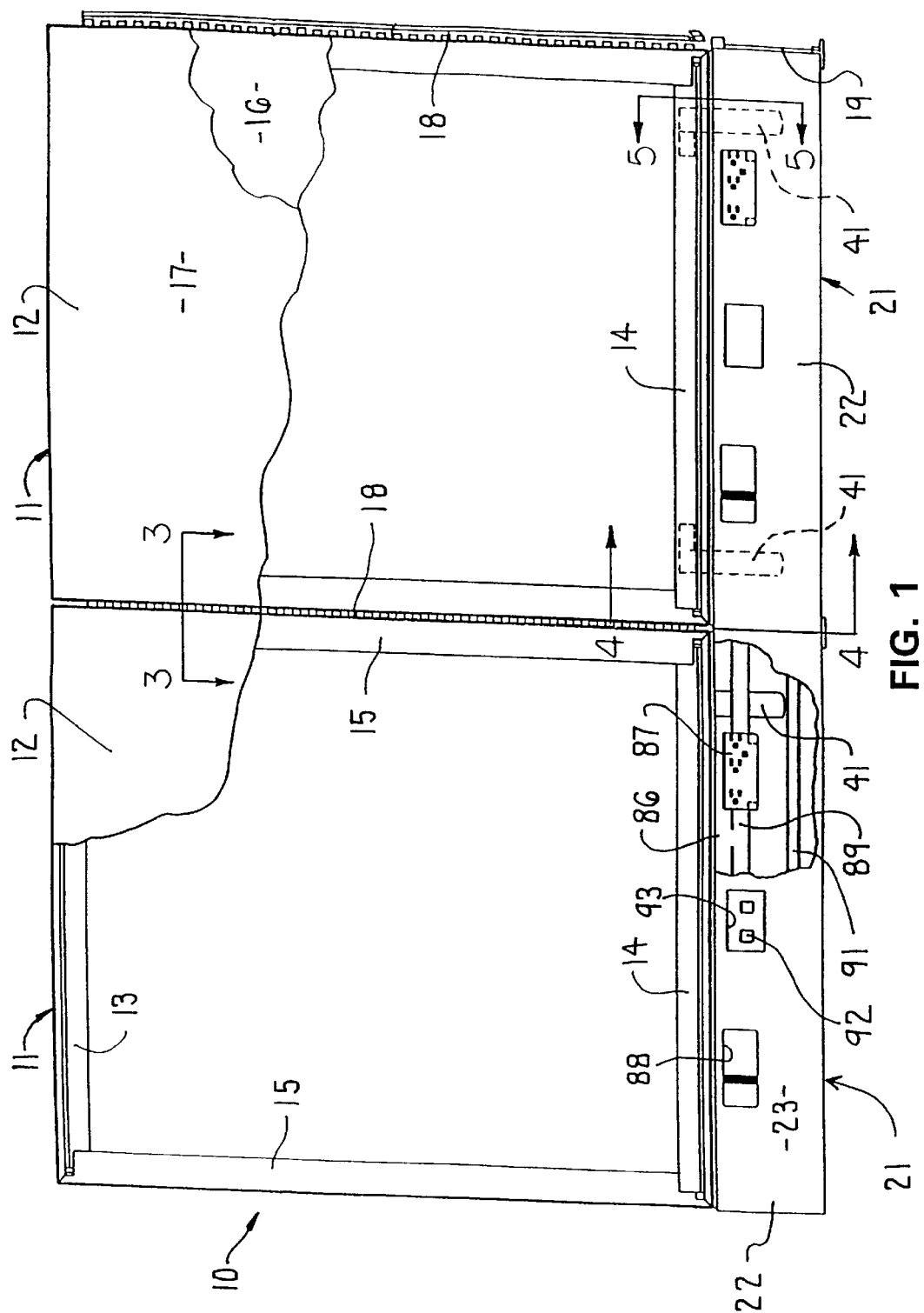
FIG. 1 is a side elevational view illustrating an upright wall system incorporating therein the improved raceway structure of the present invention, only two panels being horizontally series-connected for purposes of illustration.
Figure 2:
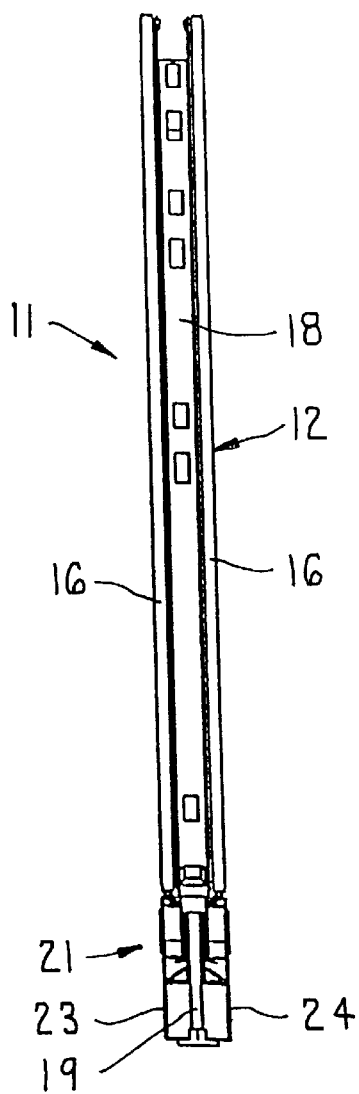
FIG. 2 is an elevational view illustrating the rightward end of the panel system illustrated in FIG. 1.
Figure 3:
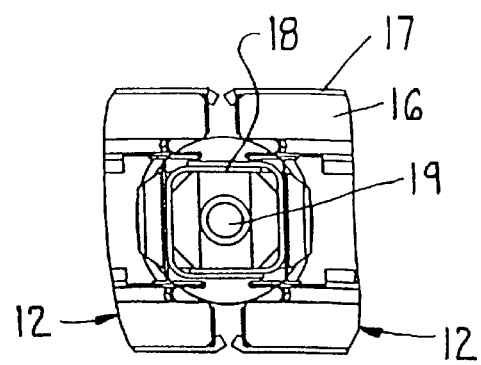
FIG. 3 is an enlarged, fragmentary cross-sectional view taken generally along line 3—3 in FIG. 1.
Figure 4:
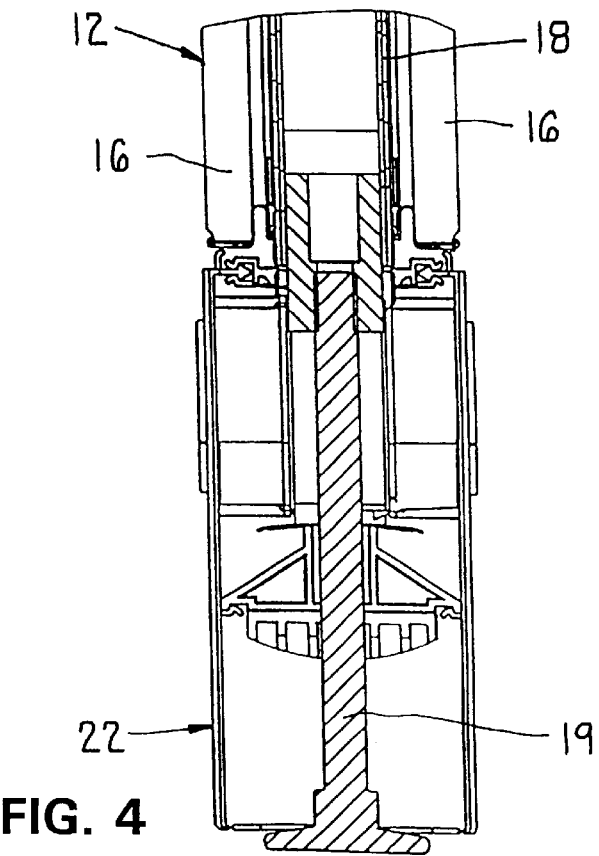
FIG. 4 is an enlarged, fragmentary sectional view taken generally along line 4—4 in FIG. 1

Certain terminology will be used in the following description for convenience in reference only and will not be limiting. For example, the words "upwardly", "downwardly", "rightwardly", and "leftwardly" will refer to directions in the drawings to which reference is made. The words "inwardly" and "outwardly" will refer to directions toward and away from, respectively, the geometric center of the panel or raceway structure and designated parts thereof. Such terminology will include the words specifically mentioned, derivatives thereof, and words of similar import.

DETAILED DESCRIPTION

FIG. 1 illustrates an upright space-dividing wall system 10 formed by a series of inter-connected upright prefabricated wall panel assemblies 11, only two substantially identical such panels assemblies 11 being illustrated. The panel assemblies 11 are typically joined in either aligned (that is, end-to-end) or in perpendicular relationship with end edges of two panel assemblies being disposed closely adjacent, as is conventional. The individual panel assemblies 11 typically have a height which is significantly less than floor-to-ceiling height, whereby the panel assemblies are supported on and project upwardly from the floor, with upper edges of the panels typically being spaced downwardly from the ceiling. The sizes of such panel assemblies in terms of widths and heights are conventional.

In the panel system 10, each pair of adjacent aligned panel assemblies 11 are connected together through an intermediate upright connector post 18 which fixedly joins to the end edges of the adjacent panels, which connector post 18 at its lower end is provided with a conventional support foot or glide 19 disposed for supportive engagement with the floor.

The panel assembly 11 comprises a main upright panel member 12 of large horizontal width (i.e., length) and height dimensions compared to the horizontal thickness thereof. The main panel member 12 includes a generally rectangular ring-like frame defined by generally parallel and horizontally elongated top and bottom frame rails 13 and 14 which are ridgedly joined together adjacent opposite ends thereof by generally parallel and vertically elongated side frame rails 15. The frame rails typically have a channel-like cross section. The ring-like frame defined by frame rails 13–15 surrounds and confines a conventional core structure (not shown) such as paper honeycomb or other conventional core material, with the frame and core structure being sandwiched between a pair of side members or sheets 16, the latter being of generally rectangular configuration so as to cover substantially the entire opposite sides of the panel member. The side members or sheets 16 may comprise plate-like fiber board members, compressed fiber glass or other conventional facing materials for such panels. These facing sheets 16 totally overlie the side faces of the panel member, and conventionally are adhesively bonded to the side faces of the frame rails. The facing sheets 16 in turn are typically covered by an exterior covering, such as a thin but flexible fabric 17, the edges of which overlap the edges of the facing sheets 16 and are secured in a conventional manner. The panel member having a general and conventional construction similar to that describe above typically has a width in the range of from about three to about four inches.

The panel member 12 has a raceway structure 21 associated therewith, which raceway structure is secured to the bottom rail 14 and extends longitudinally along the lower edge of the panel member so as to be disposed closely adjacent the floor. The raceway structure 21 provides an interior channel or compartment for accommodating electrical and/or telecommunication cabling, as is conventional in wall panel systems of this general type, so as to permit access thereto from workstations which are disposed adjacent the wall panel assemblies.

The raceway structure 21 includes a generally upwardly opening channel member 22 which is positionable generally beneath the panel member 12 and is longitudinally elongated so as to extend throughout substantially the entire length of the panel member. This channel member 22 includes generally upright side walls or covers 23 and 24 which project generally vertically in parallel relationship, with these covers 23 and 24 being approximately vertically coplanar with the exterior side faces of the panel member. The covers 23 and 24 at their lower longitudinally extending edges are joined together by a generally transversely extending and substantially horizontal bottom wall 26. In the illustrated and preferred embodiment, each side cover 23, 24 is joined to the bottom wall 26 by an integral hinge 27 (i.e., a living hinge) so as to enable each side cover 23, 24 to be individually vertically swingably moved about the respective hinge 27 between an upright closed position substantially as illustrated by solid lines in FIG. 5, and a downwardly folded open position so as to provide access to the interior of the channel member.

The channel member 22 is preferably of a one-piece construction, such as by being longitudinally extruded of a plastic material.

Each of the channel side covers 23 and 24, adjacent the longitudinally extending upper edge 25, is provided with a top securing flange 31 joined thereto and projecting transversely (here perpendicularly) inwardly from the respective side cover 23, 24. The top securing flange 31 is cantilevered horizontally inwardly through a short extent and is provided with an enlarged part or hook 32 extending along the free end thereof.

Each of the side covers 23, 24 also has a bottom securing flange 33 joined to and projecting horizontally inwardly in transverse (here perpendicular) relation to the respective side cover. The bottom securing flange 33 is joined to a vertically central portion of the respective side cover so as to be spaced downwardly a substantial vertical distance from the top securing flange 31, and is also spaced vertically upwardly a substantial distance from the bottom wall 26. The bottom securing flange 33, is cantilevered horizontally inwardly through only a small distance which is similar to the inward projection of the top securing flange 31, and adjacent the free end thereof is provided with an upwardly offset part 34 which functions similar to a hook.

While the channel member 22 has been illustrated as a one-piece construction and such construction is preferred, nevertheless it will be appreciated that the side covers and bottom wall can each be a separate member, and that the side covers can have the lower edges thereof joined to the bottom wall through appropriate fixed or releasable mechanical connections, such constructions being known in the art.

The raceway structure 21 also includes two or more supports 41 which are fixed to and project downwardly from the bottom frame rail 14 in longitudinally spaced relation therealong for supportive but releasable engagement with the channel member 22. The panel assembly 12 is preferably provided with at least two such supports 41 which, as illustrated by FIG. 1, are disposed adjacent but spaced inwardly from opposite ends of the bottom frame rail, with additional supports being provided in longitudinally spaced relation therebetween if necessary or desirable.

The support 41 includes an upright column 42 having an upper portion which projects upwardly into the interior of the channel-shaped bottom rail 14, with the upright column adjacent the upper end thereof being provided with a generally horizontal channel-shaped mounting part 43 projecting transversely thereof. The top wall of mounting part 43 overlies a wall 44 of the bottom frame rail 14 and is fixed thereto by an appropriate fastener 45, such as a threaded screw or the like. The upper end of the upright column 42, in the illustrated embodiment, is also provided with a pair of projections 46 which snugly project through openings in the wall 44 to provide additional fixed securement of the support 41 to the bottom rail 14.

The main upright column 42 of support 41 is cantilevered vertically downwardly a substantial distance below the bottom rail 14 so as to project into the interior of the channel member 22. The portion of support 41 which is positioned interiorly of channel member 22 is generally I-shaped and includes thereon upper and lower raceway engaging parts 51 and 52, respectively, for releasable supportive engagement with the channel member 22. Each of the upper and lower raceway engaging parts 51, 52 includes a wall structure which projects transversely (i.e. horizontally) in opposite directions from the upright column 42 toward the opposing side covers 23, 24. The upper raceway engaging part 51 is disposed vertically intermediate the length of the upright column 42 so as to be disposed directly under the bottom rail 14 for cooperation with the upper edges of the side covers 23, 24. The lower raceway engaging part 52 is disposed in downwardly spaced relation so as to be positioned substantially at the lower free end of the upright column 42. This lower raceway engaging part 52 is disposed vertically approximately midway between the upper and lower ends of the channel 22 and thus is spaced vertically upwardly a substantial distance above the bottom wall 26.

More specifically, the upper raceway engaging part 51 includes a channel structure 54 which projects horizontally sidewardly from opposite sides of the upright column 42 toward each of the respective side covers 23, 24. This channel structure 54 is defined by a pair of vertically spaced and substantially parallel cantilevered legs 55 defining a channel 56 therebetween which is elongated longitudinally along the raceway structure. The cantilevered legs 55 at their outer ends terminate in end faces 57 which are substantially vertically coplanar. Legs 55 adjacent the free ends thereof are also provided with projections 58 which project vertically in opposed relationship to one another so as to define a narrow slot 59 therebetween which functions as a mouth for accessing the channel 56.

The cantilevered legs 55 defining the channel 56 are preferably constructed of a material having flexibility or elasticity such as a plastics material, so as to permit sufficient resilient deflection as to accommodate insertion or removal of the upper securing flange 31, as discussed hereinafter.

The lower raceway engaging part 52 also includes wall structures 61 which project transversely from opposite sides of the upright column 42 in opposite sideward directions so as to cooperate with the opposed side covers 23–24. Each of these transversely or sidewardly projecting wall structures terminates at its outer end in a vertical end face 62 which is adapted to be disposed substantially in supportive engagement with the inner surface 25 of the respective side cover 23, 24. Wall structure 61, adjacent the free end face 62 thereof, is also provided with a downwardly projecting enlargement or rib 63 which projects downwardly below the lower surface 64 and extends longitudinally along the wall structure 61 directly adjacent the end face 62. This projection 63 is sized to create a resilient or snap-like engagement with the lower securing flange 33, as discussed below.

Figure 5:
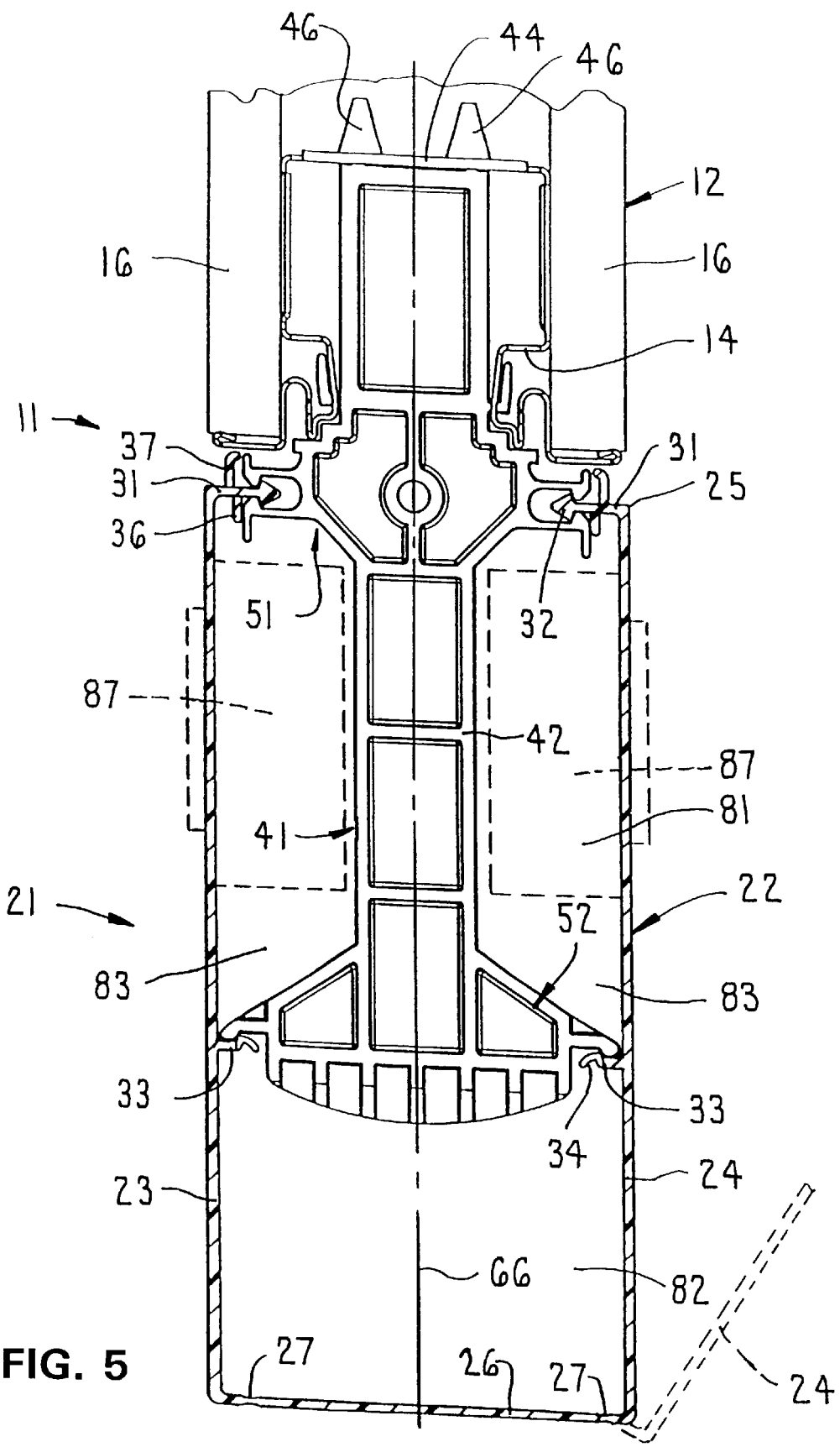
FIG. 5 is an enlarged, fragmentary sectional view taken generally along line 5—5 in FIG. 1.
Figure 6:
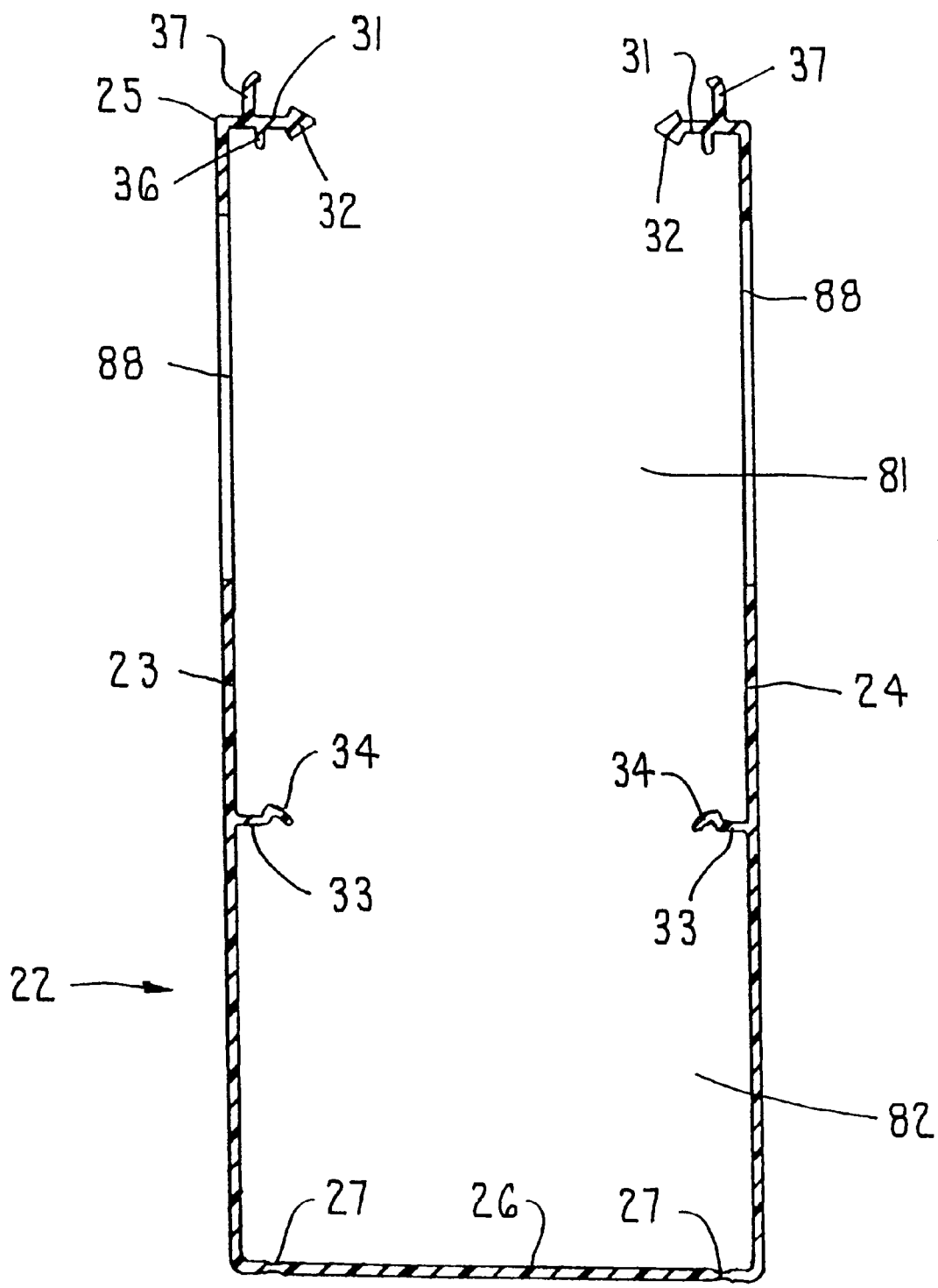
FIG. 6 is a cross-sectional view showing solely the raceway channel member detached from the panel.
Figure 7:
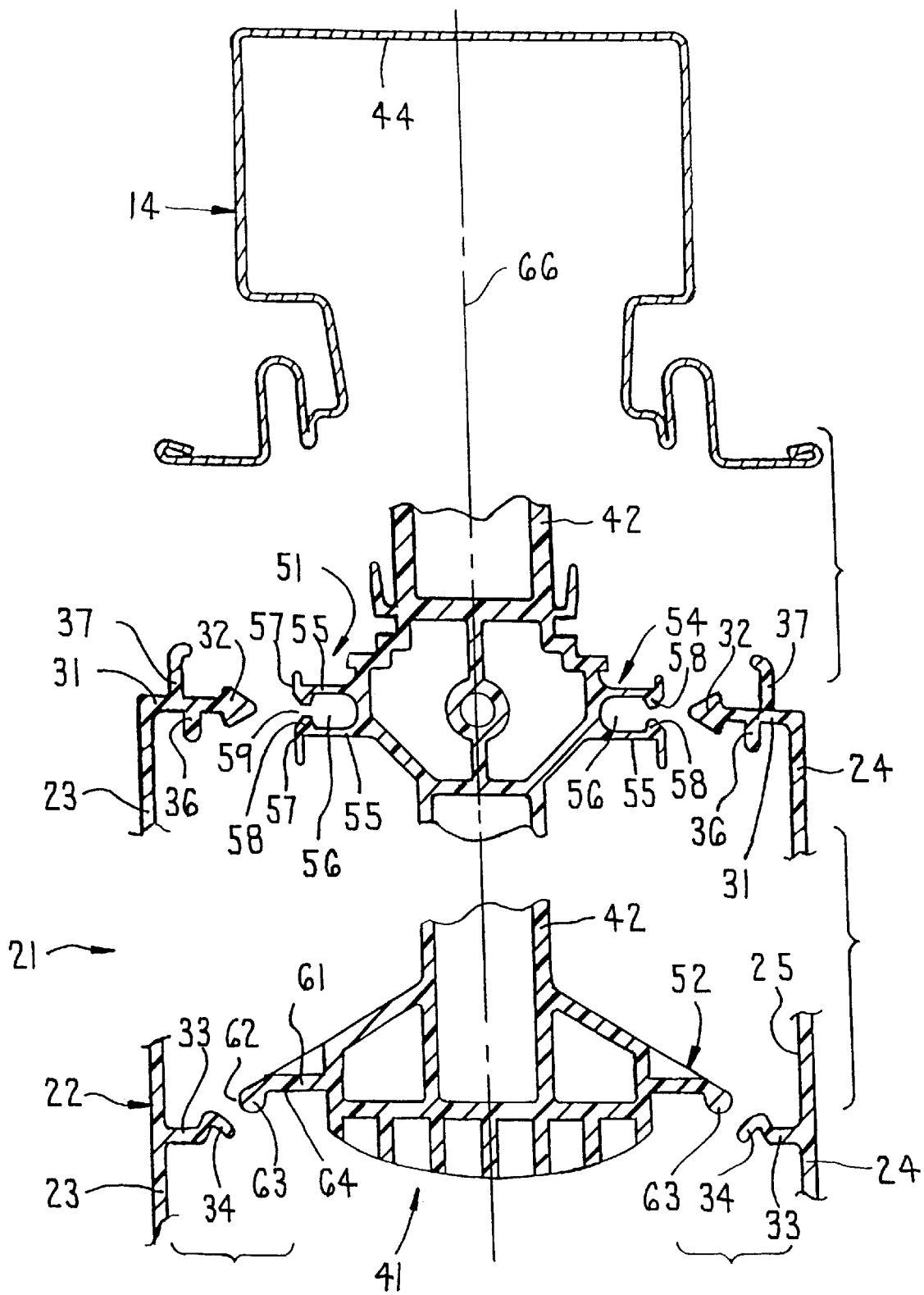
FIG. 7 is an enlarged, fragmentary cross-sectional view showing the relationship between the raceway structure and the bottom rail of the panel.
Figure 8:
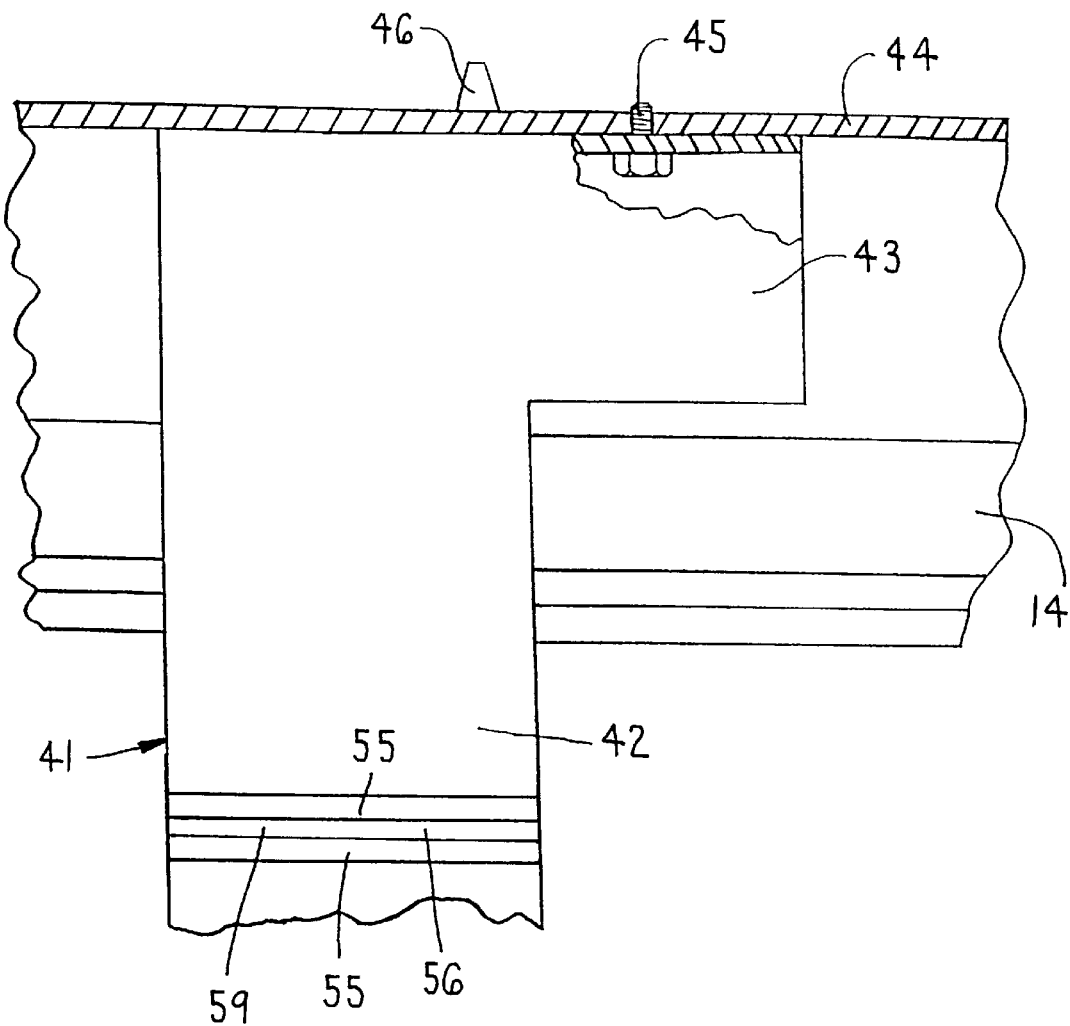
FIG. 8 is an enlarged fragmentary elevational view showing the connection of the raceway support to the bottom rail of the panel.

The support 41, possessing the constructional features discussed above, is carried by the bottom frame 14 and projects downwardly in cantilevered fashion therefrom so as to internally cooperate with and supportingly engage the channel member 22. The support 41 has a horizontal thickness (as measured in the longitudinal direction of the channel) which is less than the horizontal transverse width of the channel 22 so that the support 41, in the longitudinal or lengthwise extent of the raceway structure, provides minimal obstruction. Further, the vertical extent of the upright column 42 which extends vertically between the upper and lower raceway engaging parts 51 and 52 has a transverse horizontal width which is substantially less than the horizontal transverse width of the channel 22, as illustrated by FIG. 5, and the upright column is disposed so that it is substantially centered on the central vertical plane 66 of the raceway.

With this construction and arrangement of the support 41 relative to the channel member 22, the interior of the channel member 22 is effectively divided into upper and lower channels 81 and 82 which extend longitudinally of the raceway. The lower channel 82 is defined below the lower raceway engaging part 52 and thus extends in an unobstructed manner along the bottom of the channel member throughout the length thereof. The upper channel 81 extends longitudinally along the upper portion of the channel member 22 generally above the lower raceway engaging part 52. This upper channel 81 is obstructed solely at those locations where the center portion of the upright column 42 exists, and at these positions the upper channel 81 divides into two sidewardly spaced passages 83 which are disposed on opposite sides of the upright column 42 and extend vertically between the upper and lower raceway engaging parts 51 and 52.

With the aforementioned arrangement, the raceway structure can readily accommodate both electrical and telecommunication cabling arrangements. For example, a conventional panel-type electrical system 86 (FIG. 1) can be disposed within and extend along the interiors of the raceway channel members 22 of the serially connected panel assemblies 11, which electrical system 86 typically includes electrical receptacle units 87 mounted internally of the raceway structure and disposed so as to be accessible through openings 88 formed in the side covers 23 and/or 24. The electrical receptacle units 87 are conventionally electrically interconnected longitudinally along the raceways by appropriate electrical cables or straps 89 which extend longitudinally along the raceways and between the raceways of adjacent panels. With this type of arrangement, the electrical cables or straps 89 extending longitudinally of the raceways can readily pass along the upper channel 81 and through the passages 83 which are defined on opposite sides of the upright column 42. Electrical systems of this type as associated with raceways of interior space dividing panels are conventional, and examples of such systems are disclosed in U.S. Pat. Nos. 4,666,223, 4,781,609 and 5,236,370. Further detailed discussion of such systems is thus believed unnecessary.

An additional cabling system and more specifically a telecommunication cabling system 91 such as for telephones, computers and the like can also be disposed so as to extend longitudinally through the lower channel 82 so as to be vertically separated from the electrical cabling system 86, and such telecommunication cabling system can also be provided with appropriate connectors which project upwardly for connection to appropriate telecommunication jacks 92 or the like, the latter being suitably mounted on units which mount in openings, such as the opening 93, associated with the side covers 23, 24. An example of a preferred telecommunication cabling system is disclosed in publication WO 96/23339 and in pending U.S. Ser. No. 09/067,070.

The support 41, in the illustrated embodiment, is preferably formed by being molded of a relatively rigid plastics material.

The raceway structure 21 is assembled to the panel member 12 by initially securing the supports 41 to the bottom rail 14 so that the supports are cantilevered outwardly from the bottom rail preferably in the vicinity of the opposite ends thereof. The raceway channel member 22 is then positioned so that the channel configuration thereof envelopes the supports 41 and the side covers 23, 24 are moved inwardly until the top securing flanges 31 are resiliently snapped into the respective securing channels 56 and substantially simultaneously the lower securing flanges 33 resiliently 14 snap into positioned beneath the projections 63 associated with the side edges of the lower raceway engaging part 52. The top securing flanges 31 are inserted into channels 56 until the stop flanges 36, which project down from the flanges 31 intermediate the length thereof, abut the ends of channel legs 55. With the channel member 22 mounted to the supports 41 in this fashion, the upper edges of the side covers are securely retained both vertically and horizontally by the engagement between the top securing flanges 31 and their engagement within the channels 56 associated with the upper raceway engaging part 51, thereby supporting the raceway channel member 22 on the panel member 12 so that the raceway is confined generally between the vertical planes which define the opposite side surfaces of the panel member while positioning the raceway along the lower edge so as to be disposed directly adjacent the floor. At the same time, the resilient or snap-like engagement between the lower securing flanges 33 and their cooperation with the lower raceway engaging part 52, and the disposition of this latter engagement substantially midway between the upper and lower extremities of the raceway channel member, provides for stable support and proper positioning of the raceway channel member. In particular, the resilient engagement of the lower securing flanges 33 with the lower raceway engaging part 52 prevents the side covers 23, 24 from bowing outwardly, and at the same time the side covers are positioned closely adjacent and engagable with the end faces 57 provided on the upper raceway engaging part 51 so as to prevent the side covers from bowing or moving inwardly. This provides the raceway channel member 22 with the ability to withstand the impacts which are typically imposed on the side covers, such as due to accidental kicking or due to impacts thereof by a vacuum cleaner or the like.

The top securing flanges 31 also have a top edge flange 37 which is cantilevered upwardly for cooperative engagement with the bottom rail 14 to improve the side appearance of the panel assembly.

The raceway structure in a preferred embodiment preferably has a transverse width between about three inches to about four inches so as to be compatible with conventional wall panel widths, and at the same time preferably has a height of at least about six inches so as to provide sufficient space, such as interior upper and lower longitudinally extending channel regions 81 and 82, so as to readily accommodate all of the cabling necessary to permit both power and telecommunication cabling systems to be positioned within and extend longitudinally along the raceway. In a preferred embodiment, the height of the raceway channel is at least twice its transverse width, and the height is six or more inches.

With the raceway structure as described above, access to the interior channel regions can be readily maintained since either side cover 23 or 24 can easily be disengaged from the supports 41 so as to be swingably moved outwardly and downwardly into an open position to thus access the interior channel regions. With either side cover 23 or 24 being swingably movable into an open position, the entire interior channel regions are thus readily accessible from both sides of the panel assembly and are also readily accessible throughout the entire longitudinally lengths thereof. This thus readily facilitates the installation and/or rearrangement of the electrical and/or telecommunication cabling systems which are positioned within the raceway structure.

In the present invention, the channels 56 and edge ribs 63 each extend longitudinally of the raceway over only a short distance as determined by the longitudinal thickness of the support 41. However, the securing flanges 31 and 33 provided on covers 23, 24 preferably extend longitudinally along the full length of the covers since this provides the covers with increased stiffness, and also facilitates longitudinal extrusion of the channel member 22.

It will be readily appreciated that the raceway structure of the present invention is readily adaptable to and usable on numerous other types of interior-spaced dividing wall panels, such as panel assemblies which mount their own floor glides, as well as panels joined through intermediate support posts as illustrated herein, and that the wall panel constructions illustrated in the attached drawings and described above are merely exemplary and not limiting of the invention.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. An upright wall panel system including a plurality of upright panel assemblies which are longitudinally serially connected, each said panel assembly including an upright panel member having a raceway structure fixed to and extending longitudinally along a lower edge of said panel member for accommodating at least one of power and telecommunication cabling systems therein, said raceway structure comprising:

an upwardly-opening U-shaped channel member positioned adjacent and extending longitudinally along the lower edge of the panel member and defining therein a longitudinally extending interior channel for accommodating said one power and telecommunication cabling system;

said channel member having a bottom wall which is spaced downwardly from and extends parallel with said lower edge, and a pair of substantially parallel side covers which at lower ends join to opposite sides of said bottom wall and which project upwardly and terminate at upper ends which are positioned adjacent opposite sides of said lower edge of said panel member;

a pair of upright supports fixed to said panel member in longitudinally spaced relation therealong and cantilevered downwardly from the lower edge thereof so as to project downwardly into said interior channel, each said support defining a sidewardly projecting lower part which extends transversely across substantially the entire width of the interior channel at a location disposed substantially centrally between upper and lower ends of the channel member, said sidewardly projecting lower part dividing said interior channel into longitudinally extending upper and lower channel regions, said support including an upright column which is rigidly joined to said sidewardly projecting lower part and projects vertically upwardly for securement to the panel member, said upright column being spaced inwardly a substantial distance from and centrally between said pair of side covers so as to define open passages on opposite sides of said upright column between said upright column and said side covers, said open passages being a part of said upper channel region, and said lower channel region being unobstructed by said supports.

2. A system according to claim 1, wherein each said side cover has a lower securing flange which projects transversely inwardly therefrom at a location disposed approximately midway between the upper and lower ends of the side covers, said lower securing flange being releasably engaged with said sidewardly projecting lower part of said support.

3. A system according to claim 1, wherein said support includes a sidewardly projecting upper part which extends transversely across the interior channel at a location disposed adjacent the upper ends of the side covers, said sidewardly projecting upper part being fixedly joined to the upright column in upwardly spaced relation from the sidewardly projecting lower part, and each said side cover adjacent said upper end having an upper securing flange projecting transversely inwardly for releasable securement with the sidewardly projecting upper part.

4. A system according to claim 3, wherein each said side cover has a lower securing flange which projects transversely inwardly therefrom at a location disposed approximately midway between the upper and lower ends of the side covers, said lower securing flange being releasably engaged with said sidewardly projecting lower part of said support.

5. A system according to claim 4, wherein said channel member has a height as measured between the upper and lower ends of the side covers which is at least about twice the width of the interior channel as measured perpendicularly between the side covers.

6. A system according to claim 4, wherein said upright column has an upper portion which projects upwardly beyond said sidewardly projecting upper part and is fixedly secured to a bottom frame rail which is a fixed part of said panel member and extends lengthwise along the lower edge thereof.

7. A system according to claim 4, wherein said channel member is of a one-piece construction and each said side cover adjacent its lower end is joined by a longitudinally extending horizontal hinge to said bottom wall so as to enable each said side cover to be vertically swingably moved between open and closed positions.

8. A system according to claim 4, wherein said sidewardly projecting upper and lower parts and said upright column extending vertically therebetween define a generally I-shaped configuration when viewed in the longitudinally extending direction of the channel member, said I-shaped configuration being positioned solely in said upper channel region so that the lower channel region, as disposed below the I-shaped configuration, is longitudinally unobstructed.

9. A system according to claim 4 wherein said sidewardly projecting upper part defines a pair of channel structures which project generally horizontally sidewardly from opposite sides thereof toward the respective said side covers, each said channel structure defining a channel which opens sidewardly and extends longitudinally along said raceway structure, said upper securing flanges of the respective said side covers each being releasably engaged within said channel of a respective said channel structure.

10. A system according to claim 9 wherein each said upper securing flange defines an enlarged hook part at an inner free end thereof, each said channel structure including a pair of vertically spaced upper and lower legs configured for releasably retaining the respective said hook part therebetween.

11. A system according to claim 10 wherein each said upper securing flange defines thereon a downwardly projecting stop flange spaced sidewardly and outwardly from the respective said hook part, each said stop flange abutting an outer free end of said lower leg of the respective said channel member to prevent at least one of inward movement and bowing of said side covers.

12. A system according to claim 11 wherein said sidewardly projecting lower part defines a pair of wall structures which project transversely from opposite sides thereof toward the respective said side covers, each said wall structure terminating in an end face which is disposed in supportive engagement with an inner surface of the respective said side cover.

13. A system according to claim 12 wherein each said lower securing flange defines an upwardly offset hook member at an inner free end thereof, each said wall structure including a downwardly projecting rib adjacent the respective said end face which engages with said hook member of the respective said side cover to prevent outward bowing thereof.

14. An upright wall panel system including a plurality of upright panel assemblies which are longitudinally serially connected, each said panel assembly including an upright panel member having a raceway structure fixed to and extending longitudinally along a lower edge of said panel member for accommodating at least one of power and telecommunication cabling systems therein, said raceway structure comprising:

an upwardly-opening U-shaped channel member positioned adjacent and extending longitudinally along the lower edge of the panel member and defining therein a longitudinally extending interior channel for accommodating said one power and telecommunication cabling system;

said channel member having a bottom wall which is spaced downwardly from and extends parallel with said lower edge, and a pair of substantially parallel side covers which at lower ends join to opposite sides of said bottom wall and which project upwardly and terminate at upper edges which are positioned adjacent opposite sides of said lower edge of said panel member; and a support fixed to said panel member and cantilevered downwardly from the lower edge thereof so as to project downwardly into said interior channel, said support defining a sidewardly projecting part which extends transversely across substantially the entire width of the interior channel at a location disposed substantially centrally between upper and lower ends of the channel member and supportingly engages the respective said side covers intermediate the upper and lower edges thereof, said sidewardly projecting part dividing said interior channel into longitudinally extending upper and lower channel regions, said lower channel region being unobstructed by said support.

15. A system according to claim 14 wherein said support has a dimension defined lengthwise of said raceway structure which is a fraction of the length thereof such that said interior channel on longitudinally adjacent opposite sides of said support is unobstructed thereby.

16. A system according to claim 15 further including a pair of said supports fixed to said panel member in longitudinally spaced relation therealong.

17. A system according to claim 14 further including a pair of said supports fixed to said panel member in longitudinally spaced relation therealong.

18. A system according to claim 14 wherein said support has a generally inverted T-shaped configuration defined by an upright column fixed to said sidewardly projecting part and projecting vertically upwardly therefrom for securement to said panel member, said sidewardly projecting part defining a lower free end of said support which is spaced upwardly from said bottom wall.

19. A system according to claim 18 wherein said channel member is of a one-piece construction separate from said support and each said side cover adjacent the lower end thereof is joined by a longitudinally extending horizontal hinge to said bottom wall so as to enable each said side cover to be vertically swingably moved between open and closed positions.

20. A system according to claim 14 wherein said sidewardly projecting part defines a pair of wall structures which project transversely from opposite sides thereof toward the respective said side covers, each said wall structure terminating in an end face which is disposed in supportive engagement with an inner surface of the respective side cover, each said side cover including a securing flange which projects transversely inwardly therefrom at a location approximately midway-between the upper and lower edges of the side covers, said securing flanges being releasably engaged with terminal ends of the respective said wall structures.

21. A system according to claim 14 wherein said sidewardly projecting part and the respective said side covers include cooperative latching structures to prevent outward bowing of said side covers.

* * * * *

UNITED STATES PATENT AND TRADEMARK OFFICE
CERTIFICATE OF CORRECTION

PATENT NO. : 6,295,775 B2
DATED : October 2, 2001
INVENTOR(S) : Thomas J. Osterman et al.

It is certified that error appears in the above-identified patent and that said Letters Patent is hereby corrected as shown below:

<u>Title page,</u>
Item [75], please change:
"[75]   Inventors:   Thomas J. Osterman, Grand Haven;
                     Richard D. Elushik, Holland, both of MI (US)"

to
-- [75]   Inventors:   Thomas J. Osterman, Grand Haven;
                       Richard D. Elushik, Zeeland, both of MI (US) --

<u>Column 12,</u>
Line 6, change "midway-between" to -- midway between --.

Signed and Sealed this

Twentieth Day of August, 2002

Attest:

JAMES E. ROGAN
Attesting Officer       Director of the United States Patent and Trademark Office